United States Patent
Atta et al.

(10) Patent No.: US 9,468,902 B1
(45) Date of Patent: Oct. 18, 2016

(54) SYNTHESIS OF ZINC OXIDE NANOCOMPOSITES USING POLY (IONIC LIQUID)

(71) Applicant: KING SAUD UNIVERSITY, Riyadh (SA)

(72) Inventors: Ayman M. Atta, Riyadh (SA); Hamad A. Al-Lohedan, Riyadh (SA); Abdelrahman Osama Ezzat, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/050,433

(22) Filed: Feb. 22, 2016

(51) Int. Cl.
*C01G 9/02* (2006.01)
*B01J 20/26* (2006.01)
*B01J 20/30* (2006.01)
*B01J 20/28* (2006.01)
*C02F 1/28* (2006.01)

(52) U.S. Cl.
CPC ......... *B01J 20/261* (2013.01); *B01J 20/28047* (2013.01); *B01J 20/3078* (2013.01); *C01G 9/02* (2013.01); *C02F 1/281* (2013.01)

(58) Field of Classification Search
CPC ........ B82Y 30/00; B82Y 40/00; C01G 9/02; C01P 2004/32; C01P 2004/64
See application file for complete search history.

(56) References Cited

U.S. PATENT DOCUMENTS 7,547,347 B2  6/2009  Yang et al.

OTHER PUBLICATIONS

Liu, Yuan, et al. "ZnO quantum dots-embedded collagen/polyanion composite hydrogels with integrated functions of degradation tracking/inhibition and gene delivery." Journal of Materials Chemistry 22.2 (2012): 512-519.*

* cited by examiner

*Primary Examiner* — Richard M Rump
(74) *Attorney, Agent, or Firm* — Richard C. Litman

(57) ABSTRACT

The method of synthesizing zinc oxide polymer nanocomposite comprises: dissolving equal molar ratios of a sulfonic acid acrylic monomer and a co-monomer with a cross linking agent to form a solution; dispersing the zinc-oxide nanoparticles into the solution; polymerizing the sulfonic acid acrylic monomer with the co-monomer by adding a free radical initiator followed by heating up the solution to a temperature up to 50° C.; raising the temperature up to 60° C. until a zinc oxide polymer nanocomposite is formed; and curing the nanocomposite by heating to at least 105° C. for about 24 hours to form the zinc oxide polymer nanocomposite, wherein the ionic liquid monomer is 2-ccrylamido-2-methyl-1-propanesulfonic acid or a salt thereof and wherein the co-monomer is selected from the group consisting of vinyl pyrrolidone, acrylic acid and N-isopropyl acrylamide monomers.

5 Claims, 14 Drawing Sheets n=1, 2, 3 and 4
m= 1+, 0, 1- and 2-, respectively

SYNTHESIS OF ZINC OXIDE NANOCOMPOSITES USING POLY (IONIC LIQUID)

BACKGROUND OF THE INVENTION

1. Field of the Invention

The present invention relates to nanotechnology, and particularly to the synthesis of zinc oxide nanocomposites using poly (ionic liquid) (PIL) and the potential use thereof as adsorbents for treating wastewater.

2. Description of the Related Art

Zinc oxide nanoparticles have attracted attention as environmentally friendly materials that can be used in different environmental applications. Their nanostructure displays great advances in water purification. It has been found that zinc salts play important roles in the size and morphologies of the prepared nanoparticles. For example, zinc nitrate salt has been used to prepare ZnO nanoparticles using an amine. The modification of ZnO nanoparticles using poly(vinyl pyrrolidone) or poly(vinyl alcohol) controls their optical properties, dispersion efficiency, and photocatalytic performance.

Currently, ionic liquids (ILs) are playing an important role in preparing stabilized nanomaterials at room temperature having low general toxicity, high dispersion in water, and stability to air oxidation with controlled particle sizes. Moreover, ILs have interesting properties as a capping agent for nanomaterials over recently used chemical agents because they are a nontoxic hydrophilic solvent with tunable polarity and coordinate with nanomaterials or water pollutants. Poly (ionic liquids), PILs, possess the combined properties of ILs and polymers, which can act as highly stabilized capping agents for metal and metal oxide nanomaterial and carbon nanotubes. The literature is fairly limited in using PILs as capping and reducing agents to prepare metal or metal oxide nanomaterials, such as titanium dioxide and zinc oxide, that are used as photocatalysts to discharge the pollutants, e.g., organic reactive dyes. Zinc oxide is one of the most important photocatalytic materials, and has been extensively used for the removal of toxic dyes and pigments that could pose serious threat for the aquatic ecosystem. However, one of disadvantages affecting its application in practice is the fast recombination of photo-generated electron-hole pairs when it is applied as a photo-catalyst in water treatment processes.

Thus, the synthesis of zinc oxide nanocomposites using poly (ionic liquid) solving the aforementioned problems is desired.

SUMMARY OF THE INVENTION

The synthesis of zinc oxide nanocomposites using poly (ionic liquid) includes combining a first solution comprising a zinc oxide and a second solution comprising a poly (ionic liquid) while stirring at room temperature until a colorless solution is obtained; adjusting the pH of the solution to between 7.5 and 12.5; increasing the temperature of the solution up to 90° C.; cooling the temperature of the solution to precipitate zinc oxide nanoparticles; and isolating the zinc oxide nanoparticles by conventional methods.

The synthesis may include dissolving equal molar ratios of a sulfonic acid acrylic monomer and a co-monomer with a cross linking agent to form a solution; dispersing the zinc-oxide nanoparticles into the solution; polymerizing the sulfonic acid acrylic monomer with the co-monomer by adding a free radical initiator, followed by heating up the solution to a temperature up to 50° C.; further raising the temperature up to 60° C. until a zinc oxide polymer nanocomposite is formed; and curing the nanocomposite by heating to at least 105° C. for about 24 hours to form the zinc oxide polymer nanocomposite These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
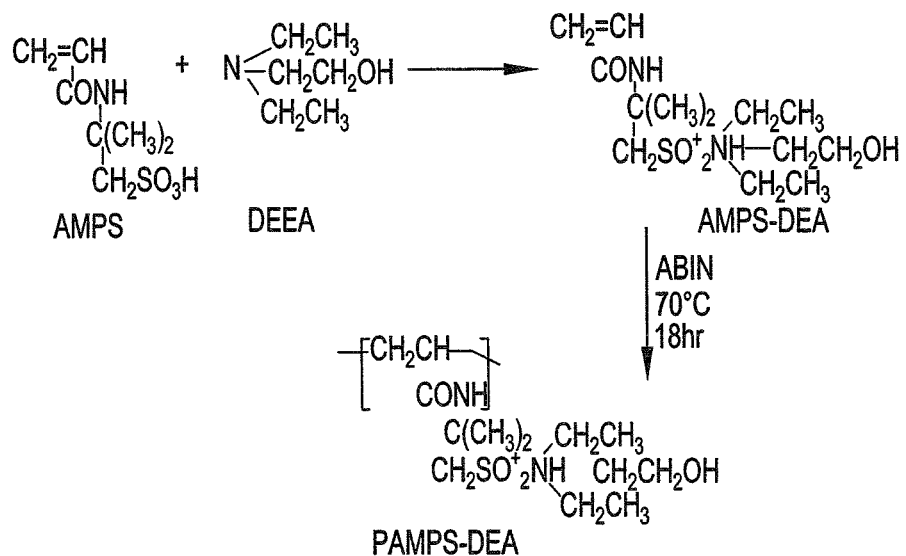
FIG. 1 is a reaction scheme for the preparation of a poly (ionic liquid) (PIL) based on PAMPS-DEA

The synthesis of zinc oxide nanocomposites using poly (ionic liquid) includes combining a first solution comprising a zinc oxide and a second solution comprising a poly (ionic liquid) while stirring at room temperature until a colorless solution is obtained; adjusting the pH of the solution to between 7.5 and 12.5; increasing the temperature of the solution up to 90° C.; cooling the temperature of the solution to precipitate zinc oxide nanoparticles; and isolating the zinc oxide nanoparticles by conventional methods.

The poly (ionic liquid) may be prepared by combining an ionic liquid monomer and a co-monomer to obtain a mixture; adding a free radical initiator to the mixture and heating the mixture up to a temperature of 70° C. for a time sufficient for completion of the synthesis; cooling the reaction mixture to obtain a polymeric ionic liquid product; dissolving the polymeric ionic liquid product in a first organic solvent to form a solution and precipitating out a solid or an oily polymeric ionic liquid product by adding the solution to a second organic solvent; and isolating the solid or the oily polymeric ionic liquid product by filtration. Typically, the synthesis process is conducted in an inert atmosphere, for example, in nitrogen or argon, and the first solvent and the second solvent are selected from the group consisting of acetone, ethanol, diethyl ether and combinations thereof. The ionic liquid monomer is 2-acrylamido-2-methyl-1-propanesulfonic acid or a salt thereof, and the co-monomer is selected from the group consisting of diethyl ethanolamine, N-vinyl pyrrolidone, acrylic acid and N-isopropyl acrylamide. Typically, the free radical initiator is azobis isobutyronitrile. However, other initiators can also be used and substituted.

The method of synthesizing zinc oxide nanoparticles can further comprise washing the zinc oxide with distilled water and ethanol to remove aggregates and organic impurities and drying at a temperature range from 50 to 150° C. for up to 8 hours. Typically, the poly (ionic liquid) (PIL) is obtained by the above-described method. The surface of the zinc oxide nanoparticles prepared by the above method is capped with poly(ionic liquids). The metal nanoparticles typically have a mean diameter from about 1 nm to about 250 nm.

Moreover, the method of synthesizing zinc oxide polymer nanocomposite may comprise dissolving equal molar ratios of a sulfonic acid acrylic monomer and a co-monomer with a cross linking agent to form a solution; dispersing the zinc oxide nanoparticles into the solution; polymerizing the sulfonic acid acrylic monomer with the co-monomer by adding a free radical initiator, followed by heating the solution to a temperature up to 50° C.; further raising the temperature up to 60° C. until a zinc oxide polymer nanocomposite is formed; and curing the nanocomposite by heating to at least 105° C. for about 24 hours to form the zinc oxide polymer nanocomposite. The ionic liquid monomer is 2-acrylamido-2-methyl-1-propanesulfonic acid or a salt thereof, and the co-monomer is selected from the group consisting of vinyl pyrrolidone, acrylic acid and N-isopropyl acrylamide monomers. The free radical initiator is ammonium persulfate and/or 2,2-azobisisobutyronitrile (AIBN). Typically, the cross-linking agent is N,N'-methylenebisacrylamide.

Further, a method of removing methylene blue from wastewater comprises contacting wastewater having methylene blue (MB) to be treated with the zinc oxide nanocomposite prepared by the above method.

As used herein, the term, "Nanoparticle" refers to a particle having at least one dimension sized between 1 and 100 nanometers. The metal nanoparticles can include zinc oxide nanoparticles. In some embodiments, the nanoparticles disclosed herein are from about 1 nm to about 250 mn in diameter, preferably about 1-50 nm. "Nanocomposites" are materials that incorporate nanosized particles that are less than 100 nm in size into a matrix of standard material, such as a polymer matrix. "Poly (ionic liquids)", PILs, are a macromolecular architecture of functional materials based on ionic liquid (IL) monomers connected through a polymeric backbone. The modification of PIL characteristics (density, viscosity, and surface tension) are of great importance for their application.

Figure 2:
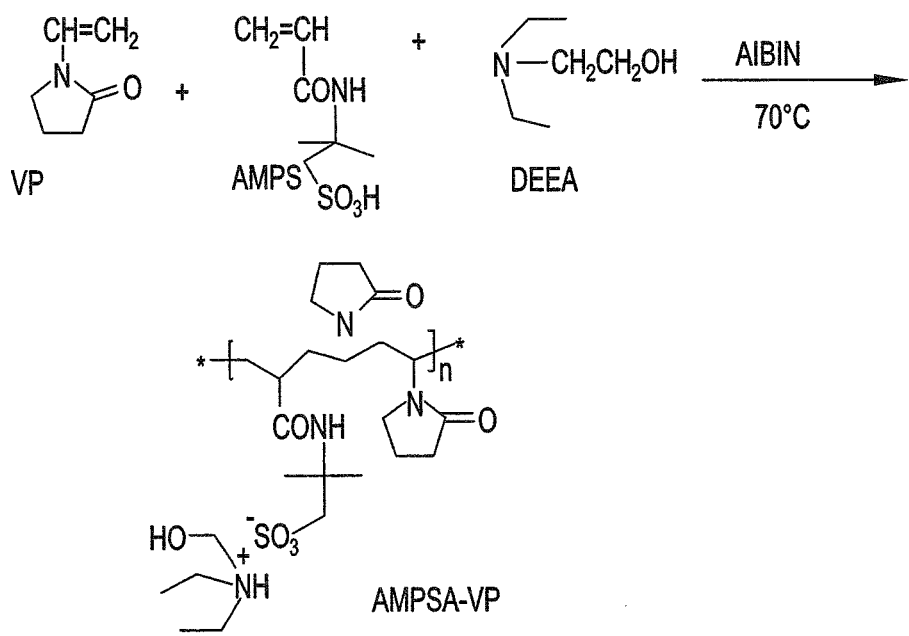
FIG. 2 is a reaction scheme for the preparation of a PIL based on AMPSA-VP.

This disclosure aims to promote an ionic liquid character of 2-acrylamido-2-methylpropane sulfonic acid (AMPS) to increase its wettability and adorability at interfaces. The quaternization of AMPS with diethyl ethanolamine (DEEA) reported here promotes a wetting actuation of poly(AMPS). Ionic polymers based on AMPS have shown excellent characteristics as polyelectrolytes. The presently described method introduces oxyethylene ammonium counter ion into the ionic liquid polymer system to promote the wetting characteristics to form an anticorrosion protective layer at the solid surfaces. The proposed chemical structure of the AMPS monomeric and polymeric ionic liquid and reaction schemes for their synthesis are represented in FIGS. 1 and 2, respectively.

Diethyl ethanolamine (DEEA) is selected as solvent to solubilize AMPS monomer at room temperature and to prepare polymerizable ionic liquid monomer AMPS-DEA. It is converted to poly(ionic liquid) by radical polymerization of the acrylic group of the AMPS-DEA monomer. The presence of the ethanol group in the chemical structure of DEEA assists its quaternization without coordination of the protonated amine center with the sulfonated anion. This was elucidated from depression of the melting point of AMPS from 192 to 42° C. due to the formation of PAMPS-DEA. The reaction scheme shown in FIG. 2 is used to explain the formation of co-polymeric ionic liquid based on AMPSA-VP.

The following examples will further illustrate the syntheses described herein.

The following material and reactants were utilized in the methods described below. 2-Acryl amido-2-methyl-1-propanesulfonic acid (AMPS), sodium 2-acrylamido-2-methyl-1-propanesulfonate (AMPS-Na); N-isopropyl acrylamide (NIPAm), acrylonitrile (AN), N-vinyl pyrrolidone (VP), and acrylic acid (AA) and acrylamide (AM)) monomers were obtained from Sigma-Aldrich Chemical Co. and used as received. N,N'-methylenebisacrylamide (MBA, 99%), ammonium persulfate (APS) and 2,2-azobisisobutyronitrile (AIBN) were used as crosslinker and radical initiators, respectively. Zinc nitrate hexahydrate and sodium hydroxide were used as zinc precursor and reagent to prepare ZnO. Diethyl ethanolamine (DEEA) was purchased from Sigma Aldrich Chemicals Co.

Example 1

First Method for the Synthesis of Poly(Ionic Liquids)

Figure 5:
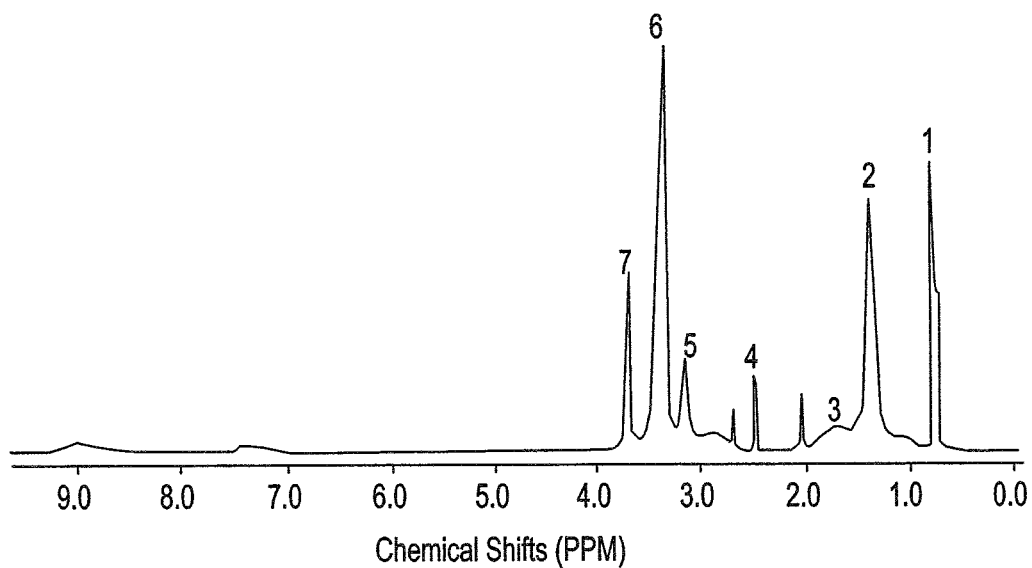
FIG. 5 is the $^1$H-NMR spectrum of PAMPS-DEA.
Figure 6:
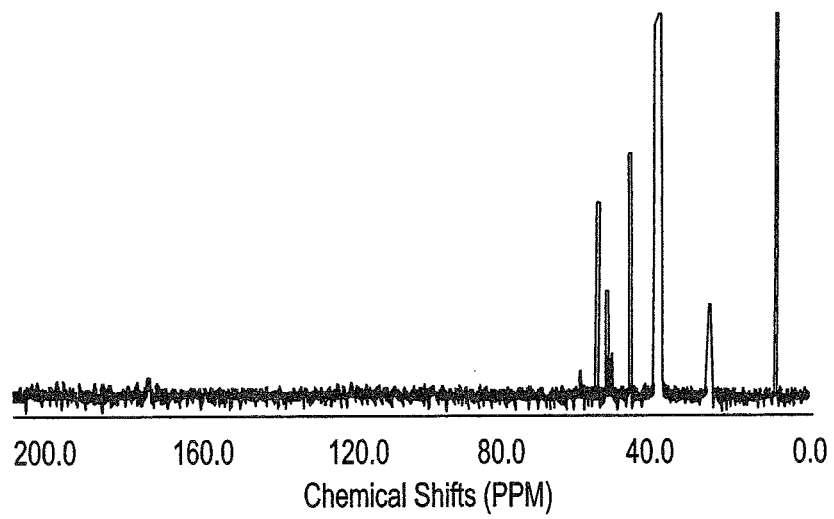
FIG. 6 is the $^{13}$C-NMR spectrum of PAMPS-DEA.

Equal molar ratios of AMPS and DEEA were mixed into a nitrogen-purged 50 ml flask at room temperature to dissolve AMPS for 8 hours to produce a transparent, light amber oil. AIBN (0.6 wt. % related to AMPS monomer) was added to the reaction mixture, and the reaction temperature increased up to 70° C. for 18 hours. The reaction mixture was cooled to room temperature to produce a transparent, dark amber mixture. The product was dissolved in ethanol with concentration of 20 wt. % and precipitated into 5 folds of acetone and filtrated under vacuum. The waxy white product was dried under vacuum to obtain transparent amber oil with a % yield polymer of 98.2% and melting temperature 42° C. The produced polymer was designated as PAMPS-DEA. The chemical structure of PAMPS-DEA is elucidated from $^1$H-NMR and $^{13}$C-NMR spectra, as shown in FIGS. 5 and 6, respectively. In this respect, the polymerization of AMPS-DEA is confirmed from disappearance of acrylic ($CH_2$=CHCON—) proton peaks at chemical shifts (δ) 6.03 (dd, 1H, J=17.1 Hz), 5.94 (dd, 1H, J=17.1 Hz) and 5.49 ppm (dd, 1H, J=3.06 Hz), it was not represented here for brevity, and appearance of new broad peaks (FIG. 1) of polymerized protons —$CH_2$—CH— at δ1.2 and 3.2 ppm, respectively. The appearance of broad peaks at δ 9.11 (br s, 1H) and 7.16 (br s, 1H) that may be attributed to cationic $^+$NH and SO$_3$H, respectively, confirms the quaternization of DEEA with AMPS to form IL. The peaks at 3.73 (s, 2H), 3.57-3.50 (m, 6H), 3.49-3.44 (m, 6H), 3.35-3.30 (m, 6H), 2.68 (s, 1H), and 0.62 (t, J=4.71 Hz) represented in FIG. 5 confirm the chemical structure of PAMPS-DEA. The $^{13}$C NMR spectrum of PAMPS-DEA provided in FIG. 6 shows peaks at δ 173.58 (CON), 60.06 (C—N$^+$), 58.13 (C—SO$_3^-$), 40.3 (C—SO$_3^-$) 26.84 (CH) and 10 ppm (CH$_3$) that confirm the formation of IL. The polymerization of AMPS-DEA is confirmed by the disappearance of C=C peaks at 122-130 ppm.

Example 2

Second Method for the Synthesis of Poly(Ionic Liquid)

Figure 7:
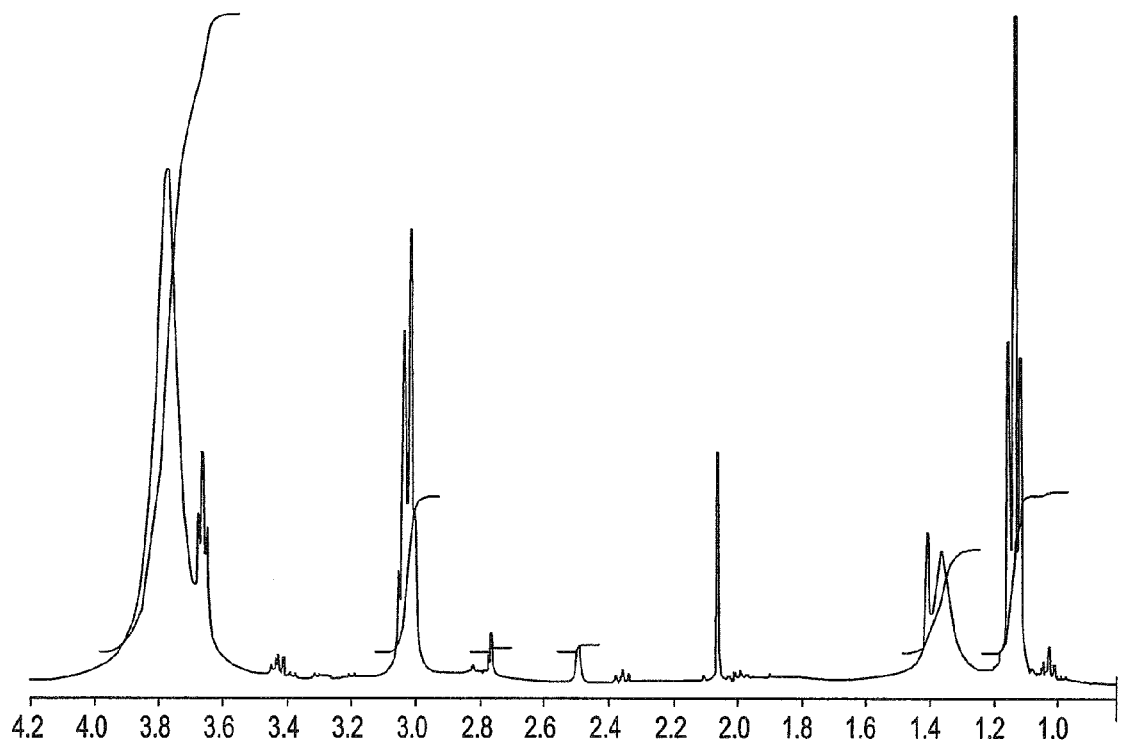
FIG. 7 is the $^1$H-NMR spectrum of AMPS/VP copolymer ionic liquid.
Figure 8:
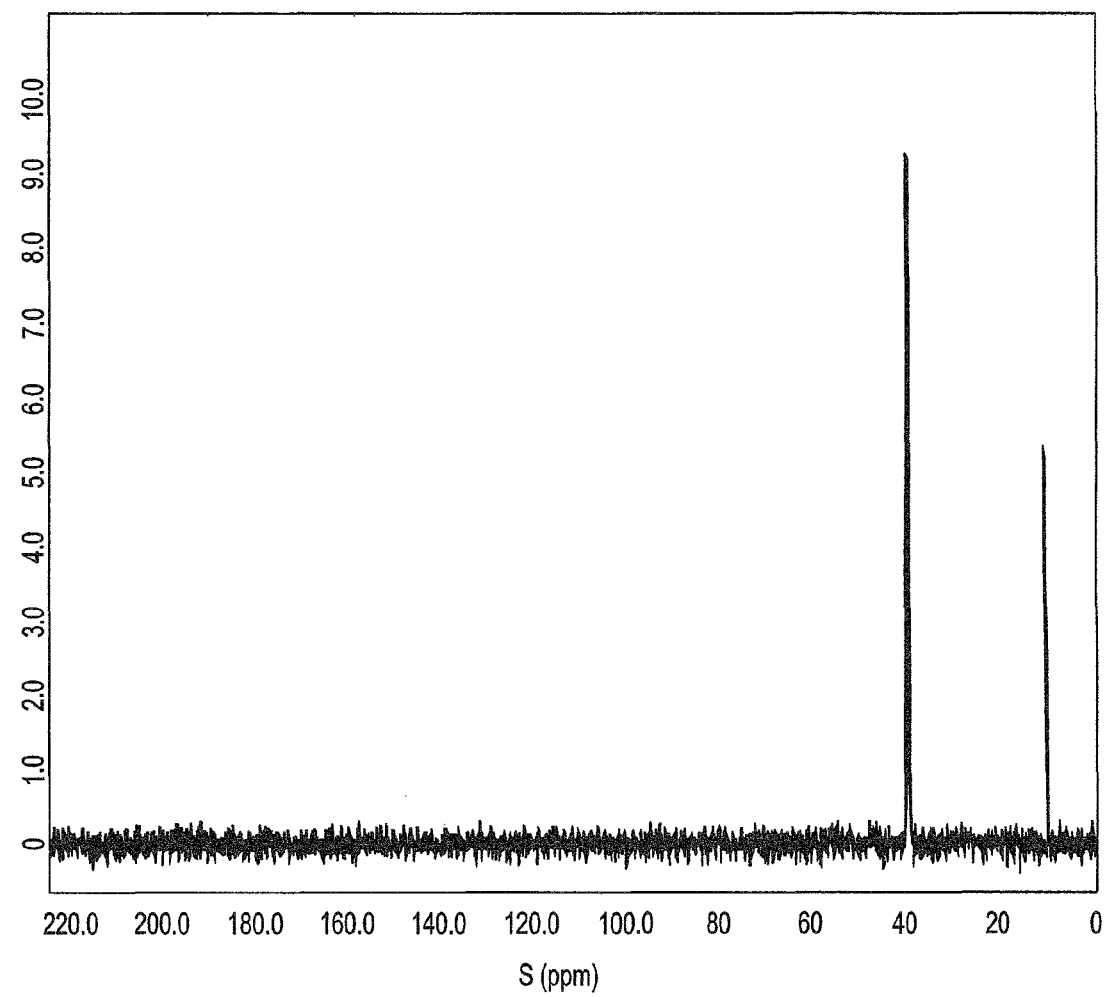
FIG. 8 is the $^{13}$C-NMR spectrum of AMPS/VP copolymer ionic liquid.

A mixture of equal molar ratios (1:1 mol %) of AMPS and VP, NIPAm or AA (6 mmol of each monomer) was stirred with 6 mmol of DEEA under nitrogen atmosphere at 10° C. in a flask. The mixing was carried out for 5 hours to complete dissolution of AMPS in VP and DEEA solutions. A transparent solution was obtained with yield of 99%, indicating the formation of a quaternized DEEA organic salt with VP and AMPS monomers. ABIN initiator (0.08 mmol) was added to the reaction mixture under nitrogen bubbling and the mixture was heated to 70° C. for 24 hrs. The viscosity of the mixture was increased, and a transparent, light yellow mixture was precipitated from acetone into cold diethyl ether (dry ice/acetone bath) and collected after filtration. The viscous oil was dried under vacuum at 40° C. to remove any residual volatile materials and to obtain AMPSA/VP, AMPSA/NPAm or AMPSA/AA polymer with high yield (98.7%). The chemical structure of AMPSA/VP was confirmed also from the NMR spectra represented in FIGS. 7-8.

Figure 9:
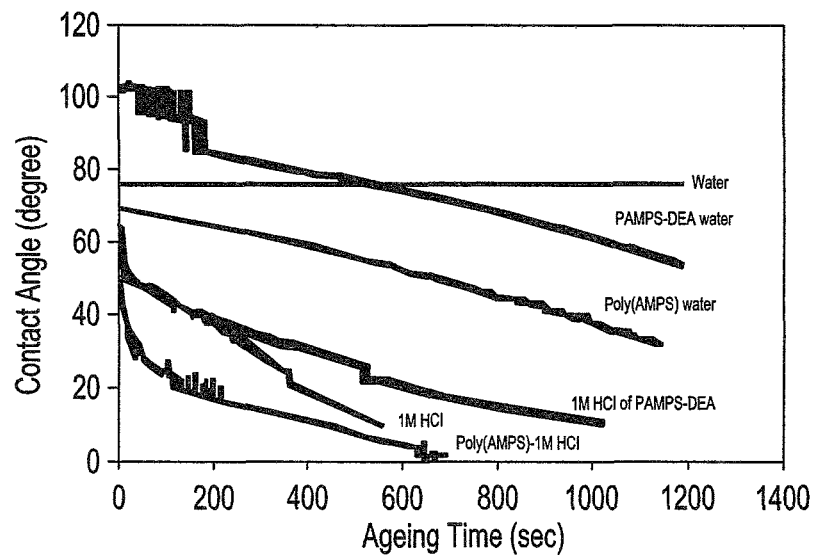
FIG. 9 shows the effect of aging time on contact angle measurements of the 100 ppm and 5 ppm of poly(AMPS) and PAMPS-DEA on a steel surface at 25° C.

The wetting characteristics for different concentrations of poly(AMPS) and PAMPS-DEA in water and 1M HCl solutions from contact angle measurements at the steel surface to investigate their abilities to form thin layer on the steel surfaces. The contact angles data versus aging time for blank water and 1M HCl solutions and poly(AMPS), PAMPS-DEA solutions at the steel surface are represented in FIG. 9.

Example 3

First Method for the Synthesis of Zinc Oxide Nanoparticles

A mixture of 0.1-1 mol/L zinc nitrate dissolved in (50 ml) water mixed with (1-10 g) of the poly(ionic liquid) prepared in method 1 (PAMPS-DEA) was stirred vigorously until a clear, colorless, transparent solution formed. About 30 ml sodium hydroxide (0.2-2 mol/L in water or ethanol solution) was added dropwise with stirring to maintain the pH from 7.5 to 12.5, and the temperature was raised from 35 to 90° C. for a period of 1 to 6 h. The mixture was then cooled at room temperature. The milky solution formed was centrifuged at 15000 rpm for 10 min. The precipitate obtained was washed several times with distilled water and ethanol to remove aggregates and organic impurities. The white precipitate was dried at temperature range at 50 to 150° C. for 1-8 hours.

Example 4

Second Method for the Synthesis of Zinc Oxide Nanoparticles

The same procedure used to prepare ZnO nanoparticles coated with PAMPS-DEA, as described in Example 3, was repeated to prepare ZnO nanoparticles coated with AMPSA/VP, AMPSA/NPAm or AMPSA/AA polymer as copolymer ionic liquids. In this case, the scheme for preparing zinc oxide and hydroxide nanoparticles by using ionic liquid is illustrated schematically in FIG. 3.

The mechanism for the formation of ZnO nanoparticles is based on production of several zinc hydroxide complexes that are produced from reaction between Zn(NO$_3$)$_2$ with NaOH in the presence of PILs based on PAMPS/DEA and AMPSA/VP, AMPSA/AA or AMPSA/NIPAm. The PILs dissociate in basic aqueous medium (pH 7.5-12.5) to a quaternary organic amine cation and an organic sulfonate anion that increases the basicity of amide groups of AMPS or VP to shift the conversion of hydroxide groups to zinc oxide as represented in the equation below:

$$4(OH)^m{}_nO_2 + 2H_2O(liq) \tag{1}$$

Figure 3:
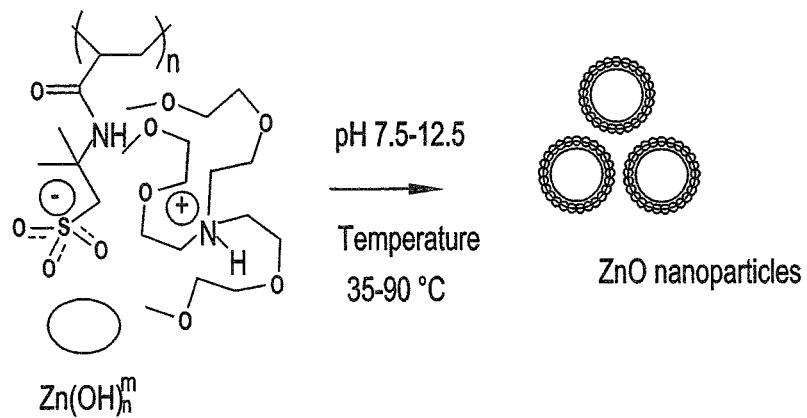
FIG. 3 is a reaction scheme for the synthesis of $Zn(OH)_2$ and ZnO nanoparticles.

The protonation of amide groups of PILs assists to act as oxidizing agent to shift the conversion of Zn hydroxide complexes to form ZnO nanoparticle, as illustrated in FIG. 3.

Figure 10:
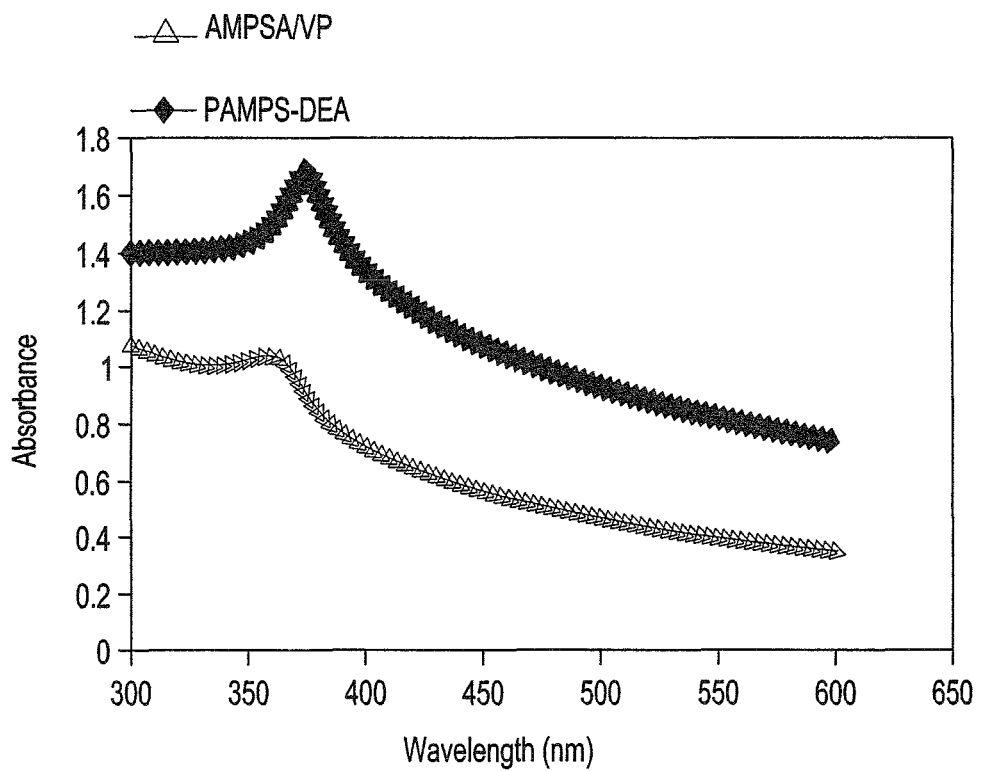
FIG. 10 is the UV-Vis absorption spectrum of ZnO nanoparticles capped with PAMPS-DEA and AMPSA/VP PILs.
Figure 11A:
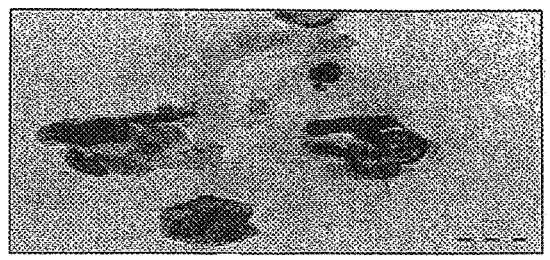
FIGS. 11A, 11B, 11C, and 11D show TEM micrographs of ZnO nanoparticles capped with PAMPS-DEA, AMPSA/AA, AMPSA/NIPAm, and AMPSA-VP PILs, respectively.
Figure 11B:
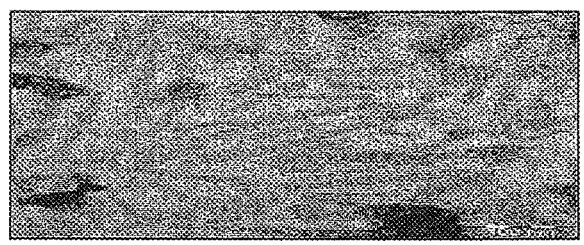
Figure 11C:
Figure 11D:
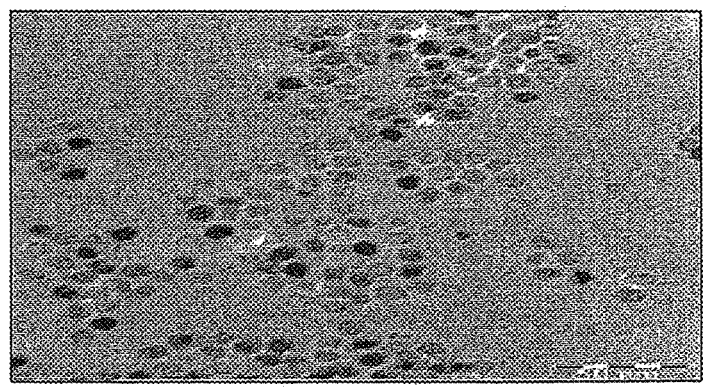

The UV-visible absorption spectra of the ZnO nanoparticles prepared in the presence of PAMPSA and AMPSA/VP, respectively, are shown in FIG. 10. All the samples have a strong absorption maximum below 400 nm, which indicates the formation of ZnO in the nano scale. The red shift of ZnO in the presence of PAMPS/EDA can be attributed to the agglomerations in the samples. This is due to the increase in particle size of ZnO.

The morphology of ZnO nanoparticles prepared in the presence of AMPSA/VP and PAMPS-DEA were observed with TEM as shown in FIGS. 11A-11D. It can be observed that the ZnO consists of non-uniform shapes, which are agglomerated, with large particle sizes in the range 80-240 nm in the presence of PAMPS-DEA and AMPSA/NIPAm (see FIGS. 11A and 11C). This agglomeration of particles was not observed for ZnO-AMPSA/AA and AMPSA/VP, in FIGS. 11B and 11D. However, they had a uniform size with particle size of 9-13 nm. This means that the presence of VP resulted in reducing agglomeration with a smaller particle size in the range 12-42 nm. This is according to the pyrrolidone part, which may control the growth of ZnO nanoparticles by forming passivation layers around the ZnO center through coordination bond creation between the nitrogen atom of the VP and the Zn$^{2+}$ ion. Besides, due to the steric effect among the polyvinyl groups, the PVP possibly prevents ZnO agglomeration.

Figure 12:
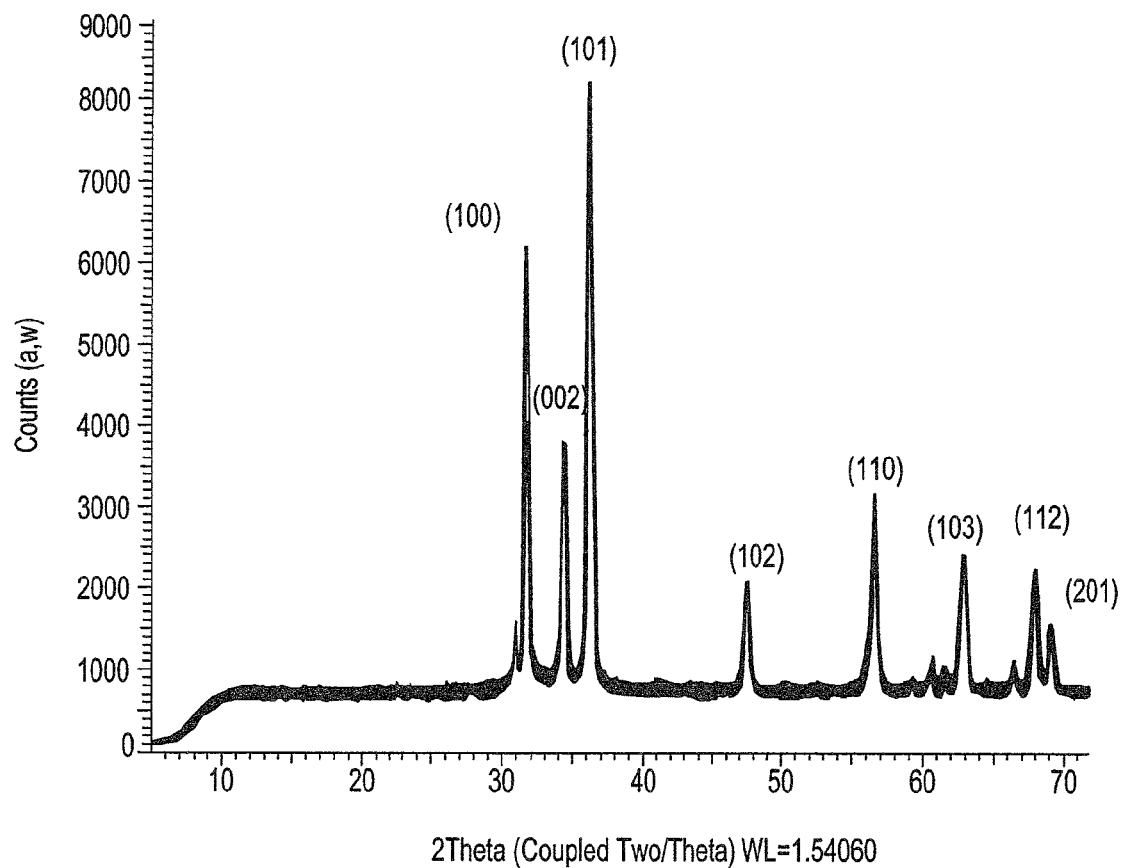
FIG. 12 is an XRD diffractogram of ZnO prepared in the presence of AMPSA-VP.

X-ray diffractograms of ZnO nanoparticles are represented in FIG. 12. The diffractograms of all the ZnO were quite similar to the standard ZnO, and are well matched, with the typical single crystalline wurtzite hexagonal phase bulk ZnO. XRD patterns did not detect peaks of other impurities, which indicates the purity of the ZnO had been successfully synthesized. The detailed analysis of the XRD is given in FIG. 12.

Figure 13A:
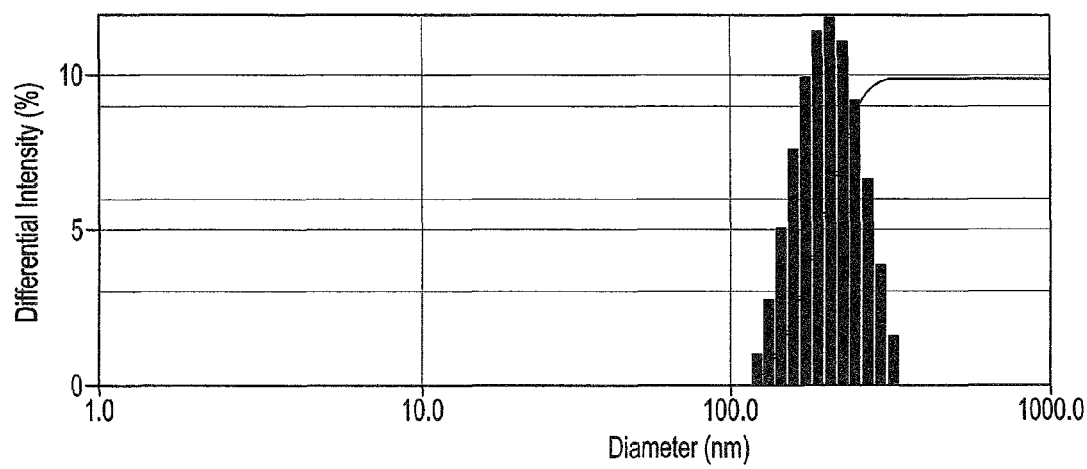
FIGS. 13A and 13B are charts of DLS data of ZnO NPs capped with PAMPS-DEA and AMPSA/VP, respectively, in water prepared in AMPSA-VP PIL at 25° C.
Figure 13B:
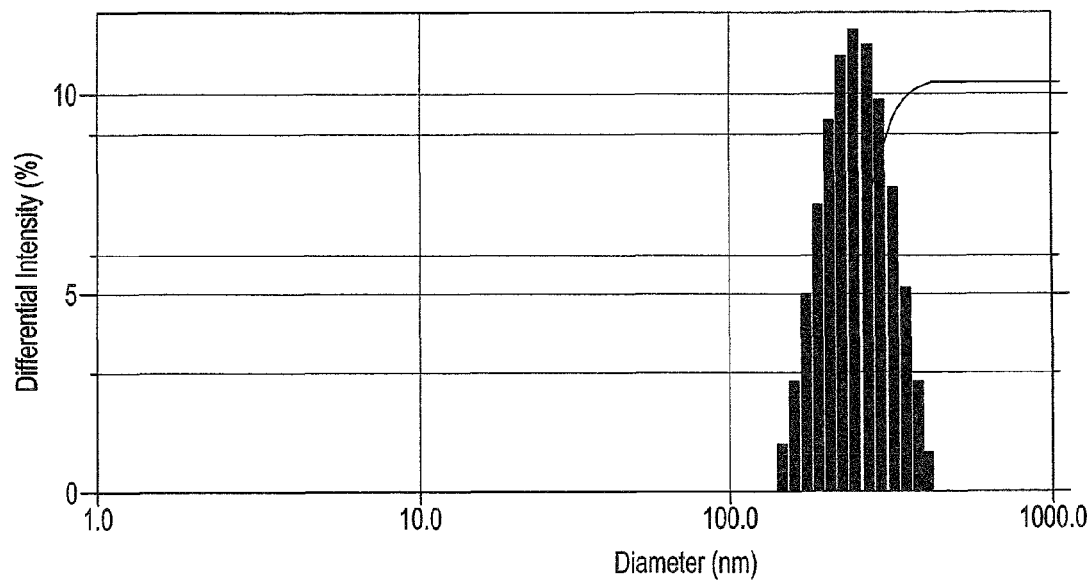

Dynamic light scattering (DLS) measurements of ZnO NPs are represented in FIGS. 13A and 13B. As shown in FIGS. 13A-13B, the hydrodynamic average particle sizes of ZnO NPs capped with PAMPSA-DEA and AMPSA-VP are 414 and 262 nm, respectively. The differences between TEM imaging and DLS measurements are possibly due to the drying forces present during TEM sample preparation. Moreover, DLS investigates the hydrodynamic diameter of the particles in solution, which is based on the Brownian motion of the particles in the water. The hydrodynamic diameter of a particle in a specific solvent is dependent on the temperature, viscosity, and the translational diffusion coefficient of the particles. However, the hydrodynamic diameter measures all molecular sizes, including the stabilizer and the hydration layer of water molecules. The DLS confirmed that monodisperse ZnO NPs were prepared in the presence of AMPSA/VP poly(ionic liquid).

Figure 14A:
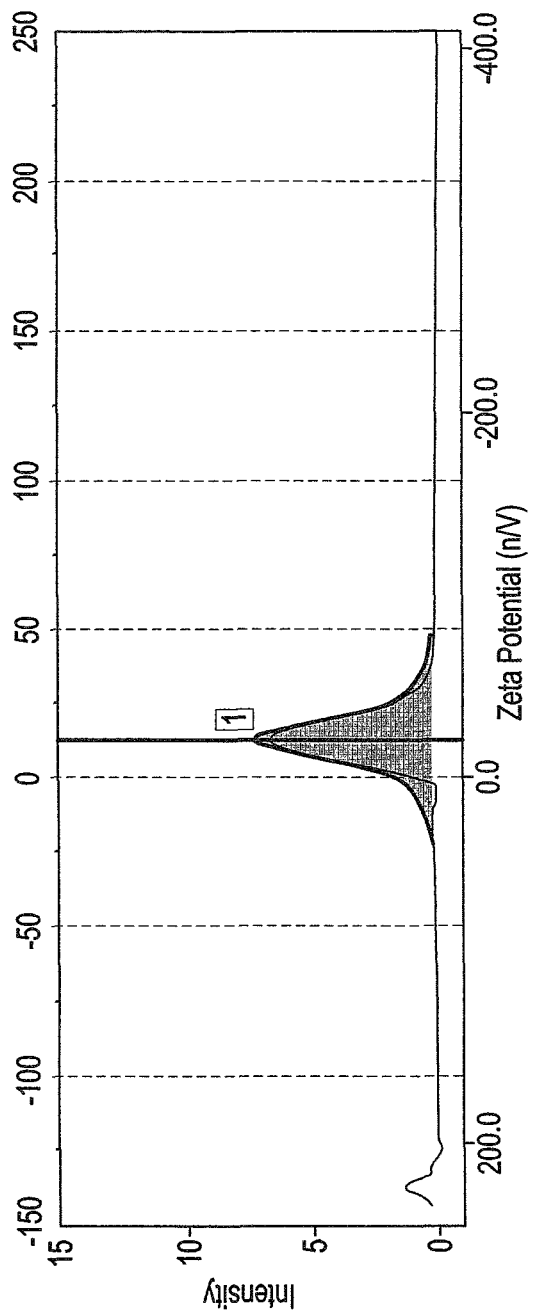
FIGS. 14A and 14B show the Zeta potential of ZnO NPs capped with PAMPS-DEA and AMPSA/VP, respectively, in water at pH 7.
Figure 14B:
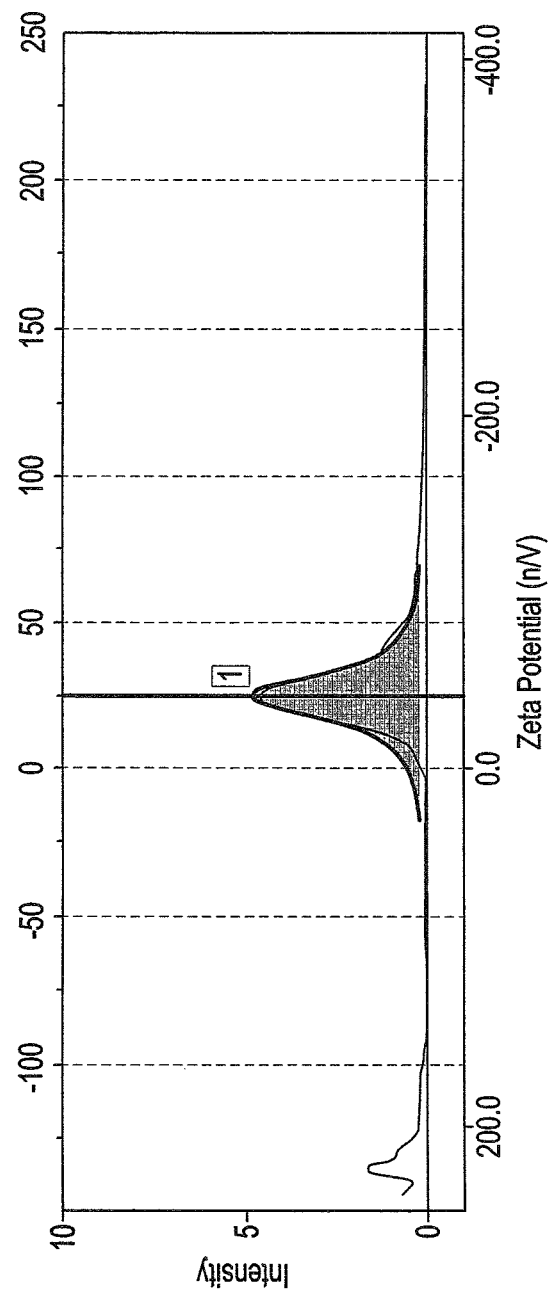

The zeta potentials of the dispersed ZnO NPs were represented in FIG. 14A-14B. It was determined that the ZnO NPs capped with AMPSA/VP (FIG. 14B) showed better dispersion stability than those capped with PAMPS-DEA NPs (FIG. 14A) and others against aggregation due to their large zeta potential (−41 mV). It can be concluded that ZnO NPs having uniform monodisperse particles size distribution with high charges are less likely to aggregate or form clusters.

Example 5

Synthesis of Zinc Oxide Nanocomposite

Equal molar ratios of AMPS-Na with VP, AA or AN monomers were dissolved in the presence of (1-10 wt. %) of MBA as a crosslinker (mol % based on 100 mol % of the two monomers). ZnO nanoparticles prepared from method 3 and 4 were dispersed at weight contents of 0, 0.1, 1, 2 and 3 wt. % related to monomers. APS was used as initiator (0.001 mol % based on mol percentages of two monomers). The crosslinking polymerization reaction was carried out at temperatures of 25 to 50° C. for 15 min, then the reaction temperature was raised up to 60° C. until the formation of the nanogel composites. The polymer rods were post-cured at 105° C. in an air oven for 24 h to ensure complete polymerization.

Example 6

Characterization of ZnO Nanocomposites

In the following, the chemical structure of the PAMPS-DEA was confirmed by $^1$H- and $^{13}$CNMR analyses that were recorded on a 400 MHz Bruker Avance DRX-400 spectrometer. The surface morphology of the nanogels was observed by (SEM) (JEOL JXA-840A) instrument at 20 kV. A few droplets of the diluted suspension were dropped onto a cover glass and then dried under vacuum at room temperature for 24 h. Samples were coated with gold vapor prior to observation.

The morphology of nanogels was observed under Transmission Electron Microscope (TEM, JEOL JEM-2100 F) electron microscope. High resolution HR-TEM images were recorded at an acceleration voltage of 200 kV. The TEM sample was prepared by placing a dilute drop of aqueous particles onto the copper grids and allowing it to dry.

Metal analysis by using the FAAS technique followed the direct aspiration into an air-acetylene flame using the atomic absorption spectrometer (Perkin-Elmer 2380, USA).

The analysis was performed using a Bruker D2 Phaser X-ray powder diffractometer (30 kV, 10 mA) using Cu anode (k=0.15406 nm) at 250° C. The patterns were collected in the 2 [theta] range of 4-700 with step size of 0.020 and scan rate of 1 s.

Zeta potentials were determined using Laser Zeta meter Malvern Instruments (Model Zetasizer 2000) in aqueous solution in the presence of KCl (0.01 M) at different pH solutions.

The size distribution of nanogel-type was determined using photon correlation spectroscopy (PCS) (PCS System, Malvern Instruments Ltd.).

Contact angles between steel surfaces and different concentrations of PAMPS-DEA and Poly(AMPS) in aqueous and 1M HCl were measured using drop shape analyzer model DSA-100 at 25° C. The advancing contact angle was measured using sessile drop technique. The needle of the instrument is located close to the steel surface and the volume of the droplet is gradually increased while recording at the same time the contact angle.

Double beam UV/vis spectrophotometer (Schimadzu UV-1208 model) at $\lambda_{max}$ (662 nm) was used to determine methylene blue (MB) dye concentrations.

Example 7

Application of ZnO Nanocomposites as Adsorbents for Waste Water Treatment

The application of the ZnO nanocomposites prepared above was used to remove methylene blue (MB) and heavy metals as a model for fast removal wastewater treatment. Working aqueous solutions of MB (1, 2, 3, 4, 5 ppm) were measured spectrophotometrically at a wavelength of 662 nm to establish the standard calibration curve. The absorbance of each unknown sample was determined from the standard calibration curve at the same wavelength. The uptake was carried out by placing dry nanogels adsorbent (g) in a series of flasks containing 10 ml of metal or dye at different concentrations between (100-5000 mg/1) according to the synthesized nanocomposites. The filtrate samples were centrifuged and analyzed at different time intervals. The MB concentration was determined at the same wavelength (662 nm). The amount of dye adsorption at equilibrium Q (mg/g) and percent extraction (% E) was calculated from the following equations:

$$Q=[(C_o-C_e)\times V/(m)] \quad (2)$$

$$\% E=[(C_o-C_e)\times 100/(C_o)] \quad (3)$$

where $C_o$ and Ce (mg/L) are the liquid phase concentrations of dye at initial and equilibrium, respectively, V (L) is the volume of the solution, and m (g) is the mass of adsorbent used. The effect of solid/liquid ratio was examined by operating various dosages (10, 20, 50, 70. 80 and 100 mg) of nanogel composites adsorbent applied to 10 mL of the solution containing 100 mg/L heavy metals at 25° C. in order to find out the effect of adsorbent dosage for the best adsorption.

The effect of contact time on the sorption was studied in different time intervals ranging from 1 to 200 min with the initial metal concentration of 100 ppm by agitation of a known weight of adsorbent in a 10 ml metal or dye solution at 25±2° C. at desired pH and at agitation speed of (150-250 rpm). After the completion of the reaction, conical flasks were taken out and the nanogels adsorbent was separated, followed by the determination of the residual metal concentrations.

The effect of solution pH on the equilibrium uptake from aqueous solution by the nanogels adsorbent was investigated. The experiments were performed by adding a definite weight of adsorbent into 10 ml (150-250 rpm) metal solution or dye and the pH of the solution was adjusted using $HNO_3$ or KOH solution.

The same equations are used to calculate the adsorption of $Co^{2+}$ and $Ni^{2+}$ cations using FAAS. In order to estimate the recovery of MB, $Co^{2+}$, and $Ni^{2+}$ cation from ZnO to reuse as adsorbents, desorption experiments were performed using 1M NaCl. The treated sample was washed with distilled water and also used for adsorption experiment.

Figure 4:
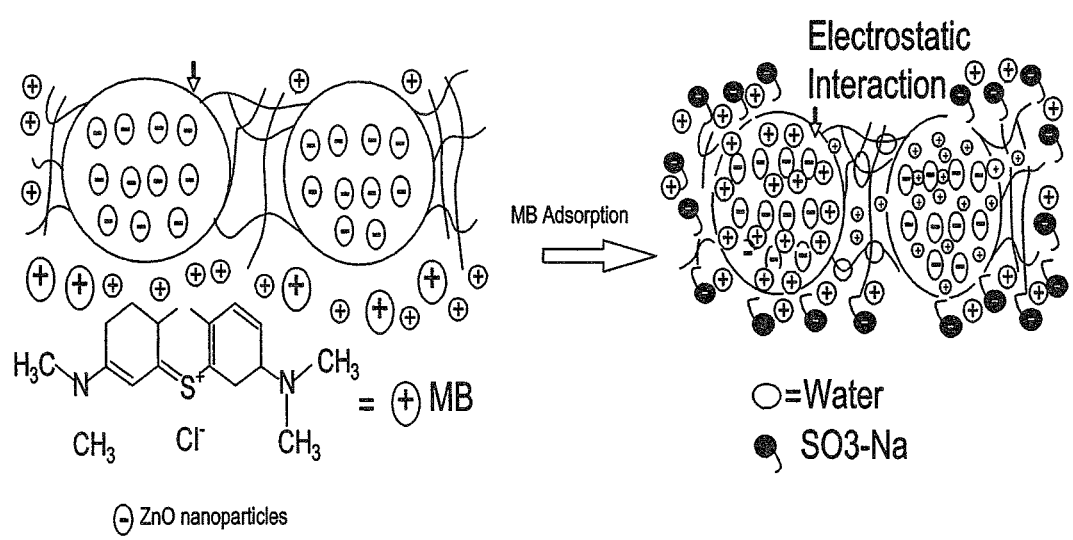
FIG. 4 is a reaction scheme showing the interaction between MB and ZnO AMPS/AN nanocomposite.

Methylene blue (MB) as cationic dye has hazard effects on the environment. It is well known that MB contains highly electronegative heteroatoms, such as sulfur and nitrogen, that can form hydrogen bonds with water to affect the diffusion of MB into adsorbents. ZnO nanocomposites can be used as adsorbent to remove toxic materials by application of an external magnetic field. The interactions between organic cations and nanocomposites are carried out using three different modes, such as formation of electrostatic interaction or neutral complexes between negative sites of composites and positive cations of organic dye or inorganic cations. It can be produced from the formation of non-coulombic interaction or formation of positive charges single complex between two positive charges of organic dyes and one negative charge of magnetite polymer composite. This type of interaction is produced from hydrophobic interaction of hydrophobic moiety of MB that can produce charge reversal at high loads. The third mode is produced from the formation of monovalent charged complex and interaction of neutral site of magnetite with one dye cation. This type of interaction is responsible for adsorption of large amounts of dye on magnetite nanocomposites. Accordingly, it is expected that the formation of electrostatic interactions between negative sites of magnetite nanocomposite produced from sulfonate and amide groups of AN/AMPS and MB cation is preferred mode at pH 9, as illustrated in FIG. 4. It indicates that the presence of both negative charges on AN/AMPS surfaces are responsible for fast diffusion of a large amount of MB dye into the AN/AMPS. It is expected that the AN/AMPS are responsible for formation of hydrogen bond with water that facilitates the electrostatic interactions between MB cations and negative charge edges AN/AMPS (FIG. 4).

Figure 15A:
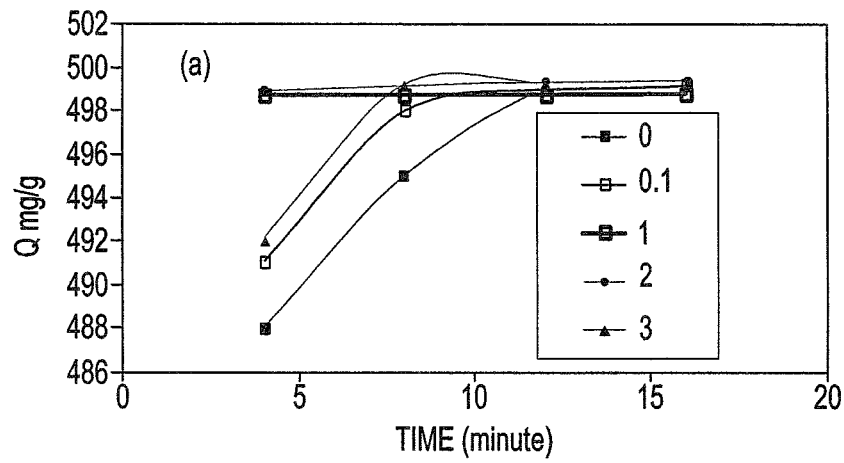
FIGS. 15A, 15B, and 15C show MB (methylene blue) removal based on AMPSNa/AN nanocomposites containing different weight contents of ZnO capped with AMPSA/VP at MB concentrations of 1000, 1500, and 3000 ppm, respectively, in aqueous solution of pH 4 and at a temperature of 25° C.
Figure 15B:
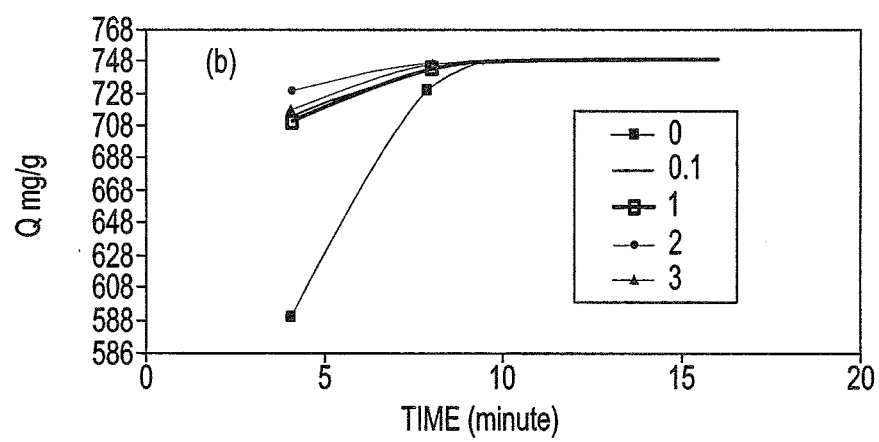
Figure 15C:
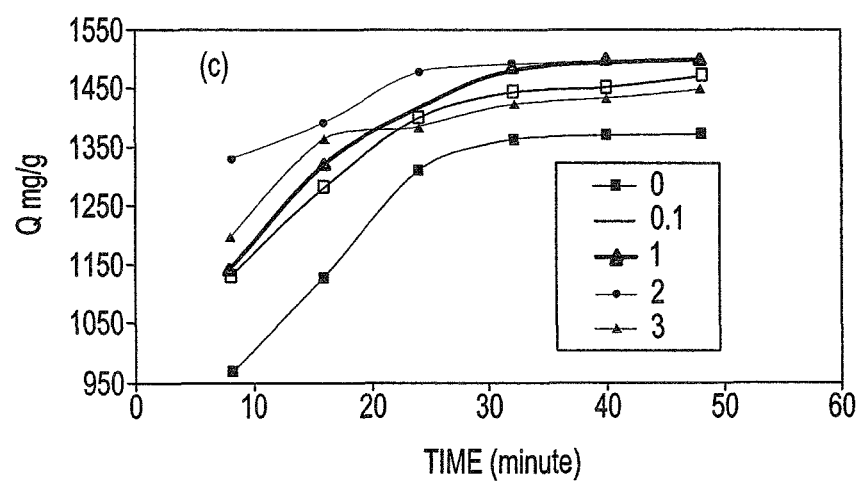

The adsorption behavior of MB onto modified magnetite AN/AMPS composites is investigated at different concentrations (ppm) and pH aqueous solution, as described in the method section above. The effect of the ZnO contents on the removal of MB at constant temperature (25° C.) and ionic strength (0.1 M) is represented in FIGS. 15A-15C. The data indicate the removal of MB dye increased with increasing AN/AMPS mol ratios up to 2 and decreased at mol ratios 3. These results are referred to screen of negative charges of sulfonate of AMPS, and also to collapse of amide groups of composites, which are affected by the AN content. It is well known that the electrostatic attraction (FIG. 4), ionic characteristics and chemical interactions of MB dye AN/AMPS affect the dye adsorption on nanocomposite adsorbents. Moreover, it is expected that there are high electrostatic attractions between positive charges of MB dye and negative charges of AN/AMPS composites at neutral and alkaline pH aqueous solutions (FIG. 4).

The desorption experiments indicated that the ZnO nanocomposites with AMPS-Na/AN can be reused for five cycles without change in the removal capacity data and without ZnO leaching.

Example 8

Antimicrobial Activity of ZnO Nanoparticles

The inactivation efficiencies for *Escherichia coli* ATCC 8739, *Staphylococcus aureus* ATCC 6538, *Bacillus subtilis* ATCC 6633, and *Pseudomonas aeruginosa* ATCC 10145 strain organisms under illuminated conditions were almost double that under dark conditions. The data are summarized in Tables 1-2, respectively. Table 1 shows the minimum inhibition concentration (MIC) and the % reduction of organism for 10, 5, 2.5, and 1 mg $mL^{-1}$ of ZnO/PAMPS-DEA samples against *Escherichia coli* ATCC 8739, *Staphylococcus aureus* ATCC 6538, *Bacillus subtilis* ATCC 6633, and *Pseudomonas aeruginosa* ATCC 10145 strains. Table 2 shows the minimum inhibition concentration (MIC) and the % reduction of organism for 10, 5, 2.5, and 1 mg $mL^{-1}$ of ZnO/AMPSA/VP samples against *Escherichia coli* ATCC 8739, *Staphylococcus aureus* ATCC 6538, *Bacillus subtilis* ATCC 6633, and *Pseudomonas aeruginosa* ATCC 10145 strains.

TABLE 1

Antimicrobial activity of ZnO/PAMPS-DEA

| Antimicrobial materials | | MBC (µg $mL^{-1}$) | MIC (µg $mL^{-1}$) | The reduction of organism (%) | | | |
|---|---|---|---|---|---|---|---|
| | | | | 1 µg $mL^{-1}$ | 2.5 µg $mL^{-1}$ | 5 µg $mL^{-1}$ | 10 µg $mL^{-1}$ |
| ZnO/PAMPS-DEA | E. coli | — | 10 | 36 ± 9 | 61 ± 8 | 74 ± 4 | 98 ± 1 |
| | S. aureus | — | 10 | — | 33 ± 4 | 80 ± 4 | 96 ± 2 |
| | B. subtilis | — | 10 | — | 31 ± 5 | 75 ± 8 | 90 ± 3 |
| | P. aeruginosa | 10 | 5 | 72 ± 5 | 88 ± 6 | 90 ± 5 | 100 |

TABLE 2

Antimicrobial activity of ZnO/AMPSA/VP

| Antimicrobial materials | | MBC (µL $mL^{-1}$) | MIC (µL $mL^{-1}$) | The reduction of organism (%) | | | |
|---|---|---|---|---|---|---|---|
| | | | | 0.1 µL $mL^{-1}$ | 0.25 µL $mL^{-1}$ | 0.5 µL $mL^{-1}$ | 5 µL $mL^{-1}$ |
| ZnO/AMPSA/VP | E. coli | — | 5 | 54 ± 7 | 64 ± 8 | 87 ± 1 | 95 ± 2 |
| | S. aureus | 5 | 0.5 | — | 55 ± 7 | 96 ± 2 | 100 |
| | B. subtilis | — | 0.5 | 58 ± 4 | 78 ± 6 | 90 ± 3 | 98 ± 0.6 |
| | P. aeruginosa | — | 0.5 | 65 ± 3 | 77 ± 8 | 86 ± 4 | 95 ± 3 |

The mechanisms of the antibacterial activity of the ZnO can be attributed to a slow release of zinc ions through dissolution of ZnO and the formation of reactive oxygen species (ROS). The data indicated the superior inactivation of organisms at low concentrations for ZnO capped with AMPSA/VP copolymer ionic liquid. Inactivation in the dark was attributed to the bactericidal effect of $Zn^{2+}$ ions. These data confirm that the ZnO NPs capped with PILs can be effectively utilized in disaster areas where there is acute scarcity of drinking water and an availability of sunshine.

It is to be understood that the present invention is not limited to the embodiments described above, but encompasses any and all embodiments within the scope of the following claims.

We claim:

1. A method of synthesizing a zinc oxide nanocomposite, comprising the steps of:
    dissolving equal molar ratios of sodium 2-acrylamido-2-methyl-1-propanesulfonate (AMPS-Na) and a co-monomer selected from the group consisting of N-vinyl pyrrolidone, acrylic acid, and acrylonitrile in a solvent in the presence of a cross linking agent to form a reaction mixture;
    dispersing zinc oxide nanoparticles in the reaction mixture;
    adding ammonium persulfate to the reaction mixture at between 25 and 50° C. to initiate polymerization; and
    continuing polymerization at 60° C. until nanogel composites form.

2. The method of synthesizing a zinc oxide nanocomposite according to claim 1, further comprising the step of heating the reaction mixture at 105° C. for about 24 hours to cure the nanogel composites and ensure complete polymerization of the zinc oxide nanocomposite.

3. The method of synthesizing a zinc oxide nanocomposite according to claim 1, wherein said crosslinking agent comprises N,N'-methylenebisacrylamide.

4. The method of synthesizing a zinc oxide nanocomposite according to claim 1, wherein said zinc oxide nanoparticles are made by adding sodium hydroxide to an aqueous solution of zinc nitrate in the presence of a poly (ionic liquid) (PIL).

5. The method of synthesizing a zinc oxide nanocomposite according to claim 1, wherein said zinc oxide nanoparticles comprise nanoparticles of zinc oxide disposed in a matrix of a poly (ionic liquid).

* * * * *